(12) United States Patent
Li et al.

(10) Patent No.: US 8,051,362 B2
(45) Date of Patent: Nov. 1, 2011

(54) DISTRIBUTED DATA STORAGE USING ERASURE RESILIENT CODING

(75) Inventors: Jin Li, Sammamish, WA (US); Li-Wei He, Redmond, WA (US); Jian Liang, Huntington Station, NY (US)

(73) Assignee: Microsoft Corporation, Redmond, WA (US)

( * ) Notice: Subject to any disclaimer, the term of this patent is extended or adjusted under 35 U.S.C. 154(b) by 1173 days.

(21) Appl. No.: 11/763,891

(22) Filed: Jun. 15, 2007

(65) Prior Publication Data

US 2008/0313241 A1 Dec. 18, 2008

(51) Int. Cl.
*H03M 13/00* (2006.01)
(52) U.S. Cl. .................. 714/776; 714/755; 714/784
(58) Field of Classification Search .............. 714/776, 714/755, 714, 758, 766, 784
See application file for complete search history.

(56) References Cited

U.S. PATENT DOCUMENTS

| | | | |
|---|---|---|---|
| 5,617,541 A | 4/1997 | Albanese et al. | |
| 6,138,125 A | 10/2000 | DeMoss | |
| 6,553,511 B1 * | 4/2003 | DeKoning et al. | 714/6 |
| 6,694,479 B1 | 2/2004 | Murthy et al. | |
| 6,928,584 B2 * | 8/2005 | Labana | 714/13 |
| 7,013,364 B2 * | 3/2006 | Honda et al. | 711/114 |
| 7,020,823 B2 | 3/2006 | Bushmitch et al. | |
| 7,073,115 B2 | 7/2006 | English et al. | |
| 7,103,824 B2 | 9/2006 | Halford | |
| 7,562,253 B1 * | 7/2009 | Labana | 714/13 |
| 7,653,796 B2 * | 1/2010 | Inoue et al. | 711/170 |
| 7,676,723 B2 * | 3/2010 | Cuylen | 714/748 |
| 2005/0283537 A1 | 12/2005 | Li et al. | |
| 2005/0289402 A1 | 12/2005 | Nerl et al. | |
| 2006/0074995 A1 | 4/2006 | Hafner et al. | |
| 2006/0080454 A1 | 4/2006 | Li | |
| 2006/0212782 A1 | 9/2006 | Li | |

OTHER PUBLICATIONS

Alon, N., and M. Luby, A linear-time erasure-resilient code with nearly optimal recovery, IEEE Trans. Inform. Theory, Nov. 1996, vol. 42, pp. 1732-1736.
Blömer, J., M. Kalfane, M. Karpinski, R. Karp, M. Luby, D. Zuckerman, An XOR-Based erasure-resilient coding scheme, ICSI Technical Report tr-95-048, Aug. 1995.
Chee, Y. M., C. J. Colbourn and A. C. H. Ling, Asymptotically optimal erasure-resilient codes for large disk arrays, Discrete Applied Mathematics 2000, vol. 102, pp. 3-36.
Weatherspoon, H., and J.D. Kuubiatowicz, Erasure coding vs. replication: A quantitative comparison, Peer-to-Peer Systems: First International Workshop, IPTPS 2002, 2002, LNCS 2429, pp. 328-337.

* cited by examiner

*Primary Examiner* — Fritz Alphonse
(74) *Attorney, Agent, or Firm* — Lyon & Harr, L.L.P.; Craig S. Fischer

(57) ABSTRACT

An erasure resilient coding (ERC) distributed data storage system and method for storing data in a reliable and survivable fashion while minimizing hardware and associated costs. The system and method includes forming multiple protection groups both within and across storage nodes of the storage system. Data is segmented into original data blocks and ERC data blocks. Load balancing occurs by interleaving storage nodes with equal numbers of original data blocks and ERC data blocks while ensuring each node has an equal number of combined read and write operations. Unique read and write operations on data block can be performed independent of other data blocks in a protection group. The write operation uses Galois field arithmetic and ERC transform to either write or append a new data block to a storage node. The read operation recovers data in a variety of ways using ERC decoding.

20 Claims, 9 Drawing Sheets

DISTRIBUTED DATA STORAGE USING ERASURE RESILIENT CODING

BACKGROUND

Enterprises and consumers today face the problem of storing and managing an ever-increasing amount of data on non-volatile data storage systems such as hard disk drives. One promising direction in computer storage systems is to harness the collective storage capacity of massive commodity computers to form a large distributed data storage system. When designing such distributed data storage system an important factor to consider is data reliability. Once data is stored a user typically does not want or cannot afford to lose any of the stored data. Unfortunately, the data management chain is prone to failures at various links that can result in permanent data loss or a temporary unavailability of the data. For example, any one of a number of individual components of a massive distributed data storage system may fail for a variety of reasons. Hard drive failures, computer motherboard failures, memory problems, network cable problems, loose connections (such as a loose hard drive cable, memory cable, or network cable), power supply problems, and so forth can occur leaving the data inaccessible.

For distributed data storage systems to be useful in practice, proper redundancy schemes must be implemented to provide high reliability, availability and survivability. One type of redundancy scheme is replication, whereby data is replicated two, three, or more times to different computers in the system. As long as any one of the replica is accessible, the data is available. Most distributed data storage systems use replication for simplified system design and low access overhead.

One problem, however, with the replication technique is that the cost of storing a duplication of data can become prohibitively expense. Large storage cost directly translates into high cost in hardware (hard drives and associated machines), as well as the cost to operate the storage system, which includes the power for the machine, cooling, and maintenance. For example, if the data is replicated three times then the associated costs of storing the data are tripled.

One way to decrease this storage cost is by using another type of redundancy scheme called erasure resilient coding (ERC). Erasure resilient coding enables lossless data recovery notwithstanding loss of information during storage or transmission. The basic idea of the ERC technique is to use certain mathematical transforms and map k original data blocks from an original data piece into n total data blocks, where n>k. The original data piece includes the k original data blocks and the n−k parity (or ERC) data blocks. When there are no more than n−k failures all original data can be retrieved using the inverse of the mathematical transforms. At retrieval time the n data blocks are retrieved to recover the original data piece. Currently, the main use of the ERC technique in distributed data storage systems is in the form of large peer-to-peer (P2P) systems.

A protection group is often used in ERC to provide an added measure of protection to the data. Typically, each of the n data blocks is placed in a single protection group. One problem, however, with using the ERC technique in distributed data storage systems is that because the data is fragmented and stored in a plurality of blocks multiple protection groups cannot be created. Another problem is that when a data block is modified each of the data blocks belonging to the same protection group must also be modified. In other words, whenever a data block is written or read then all the other data blocks in the protection group also must be modified.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The erasure resilient coding (ERC) distributed data storage system and method includes using ERC in a distributed data storage environment to achieve the same level of reliability as data replication with much less hardware. The system and method use software instead of hardware to improve data reliability and survivability. More specifically, the system and method allows the formation of multiple protection groups that contain a plurality of data blocks. The multiple protection groups are formed both across and within storage nodes. Because of the unique read and write operations based on erasure resilient coding, the reading and writing of each data block can be performed independent of other data blocks in the same protection group.

The ERC distributed data storage system and method also achieves load balancing over the ERC distributed data storage system. In particular, an original data piece is segmented into a plurality of data blocks, including original data blocks and ERC data blocks. The system includes several storage nodes that store both types of data blocks. The system and method interleaves original data blocks and ERC data blocks among the storage nodes so that the load is balanced between nodes. In some embodiments, this balancing is achieved by dispersing the data blocks such that each storage node performs approximately the same number of read and write operations. In other embodiments, the balancing is achieved by ensuring that each storage node contains a relatively equal number of original data blocks and ERC data blocks.

The ERC distributed data storage system and method reads and writes a data block independent of other data blocks with the same protection group. The unique write operation is capable of a true write operation (when there is an existing data block) or an append operation (when there is not an existing data block). In the first case, the write operation replaces an old data block with a new data block and performs Galois field arithmetic on the new and old data blocks. Further mathematical operations are performed, including a mathematical transform using erasure resilient coding and a second Galois field arithmetic operation. The resultant transformed data block is written to each of the storage nodes containing the old data block. In the second case, there is no old data block and the new data block is appended to either the front or back of the data after being mathematically processed as described above.

The unique read operation of the ERC distributed data storage system and method is capable of recovering a data block in a variety of ways. First, any data block that is live and fresh on its storage node is directly read out of the node. Second, if the data block is stale then a search is made for one protection group having all the live data blocks of the original data piece. Stale means that a failure has occurred or that the machine is in the process of recovering from such a failure. If such a protection group is found, then a distributed read and ERC decoding are performed to recover the data block. Third, if such a protection group cannot be found then another type of decoding is performed to attempt to recover the data block.

It should be noted that alternative embodiments are possible, and that steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout:

DETAILED DESCRIPTION

In the following description of the erasure resilient coding (ERC) distributed data storage system and method reference is made to the accompanying drawings, which form a part thereof, and in which is shown by way of illustration a specific example whereby the ERC distributed data storage system and method may be practiced. It is to be understood that other embodiments may be utilized and structural changes may be made without departing from the scope of the claimed subject matter.

I. System and Operational Overview

Figure 1:
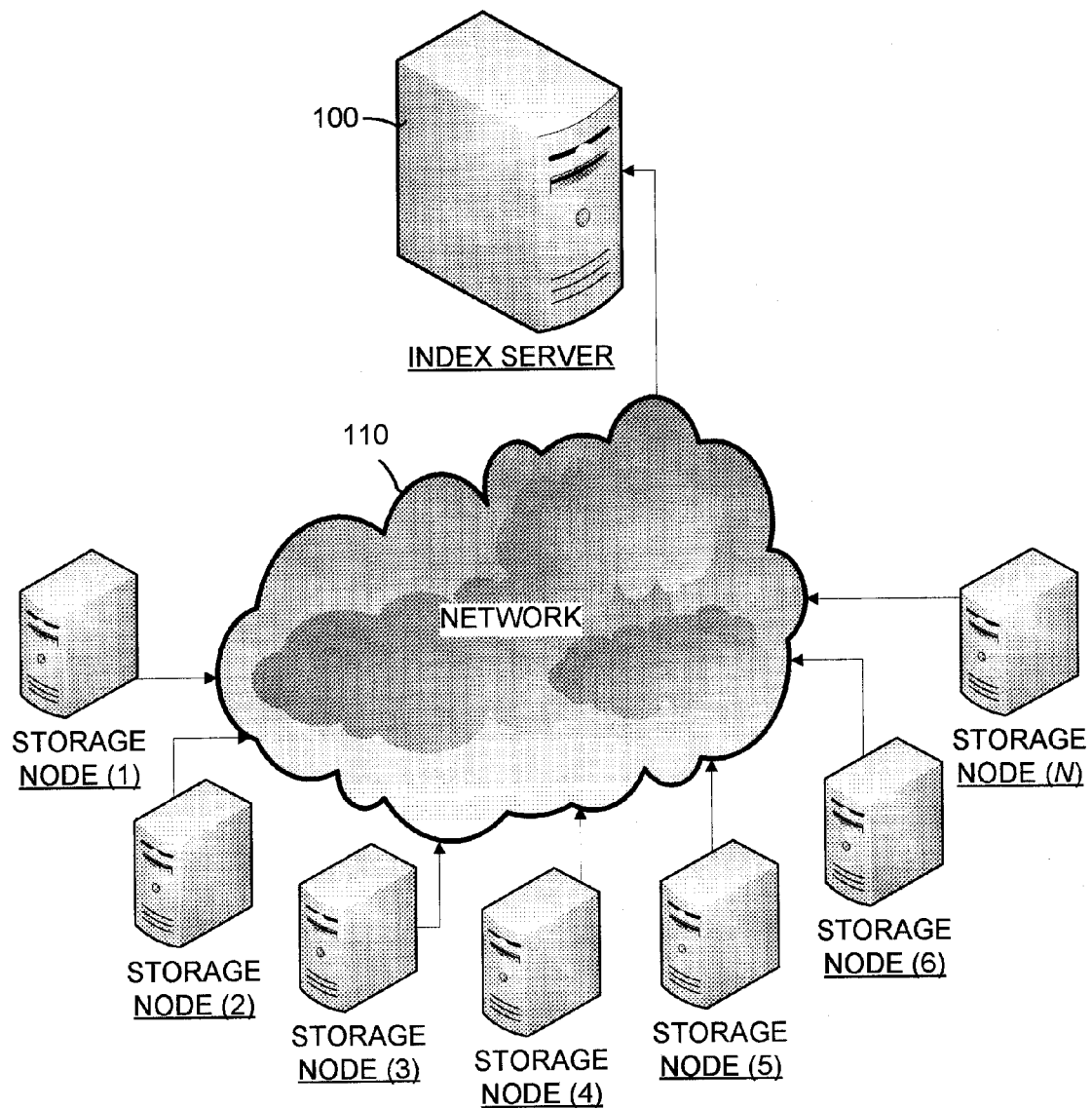
FIG. 1 is a block diagram illustrating the erasure resilient coding (ERC) distributed data storage system and method disclosed herein implemented in a distributed data storage environment.
Figure 2:
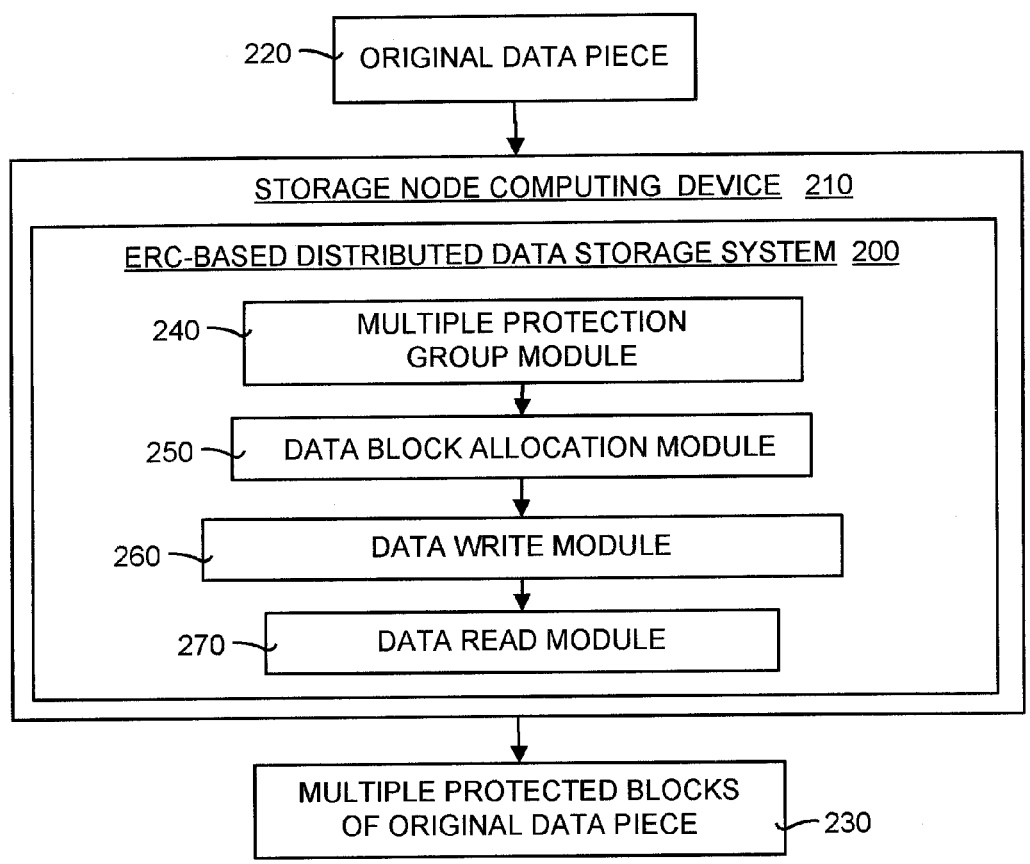
FIG. 2 is a block diagram illustrating an exemplary implementation of the ERC distributed data storage system disclosed herein.

FIG. 1 is a block diagram illustrating the ERC distributed data storage system and method disclosed herein implemented in a distributed data storage environment. Referring to FIG. 1, the distributed data storage environment includes a plurality of storage nodes labeled as storage node (1) to storage node (N). Each of these storage nodes is a computing device. The storage nodes are in communication with an index server 100 through a network 110. As explained in detail below, the index server 100 contains an index table (not shown) for tracking the location of data blocks dispersed throughout the storage nodes. The data blocks are fragments of an original piece of data (or data piece). As shown in FIG. 2, the ERC distributed data storage system and method described in detail below is running on each of the storage nodes.

FIG. 2 is a block diagram illustrating an exemplary implementation of the ERC distributed data storage system 200 disclosed herein. It should be noted that FIG. 2 is merely one of several ways in which the ERC distributed data storage system 200 may be implemented and used. The ERC distributed data storage system 200 may be implemented on various types of processing systems, such as on a central processing unit (CPU) or multi-core processing systems.

Referring to FIG. 2, the ERC distributed data storage system 200 is shown implemented on a storage node computing device 210. It should be noted that the storage node computing device 210 may include a single processor (such as a desktop or laptop computer) or several processor and computers connected to each other. The input to the ERC distributed data storage system 200 is an original data piece (box 220). As explained in detail below, the ERC distributed data storage system 200 processes this original data piece, breaks the original data piece into several blocks, performs ERC processing on the blocks to obtain multiple protected blocks of the original data piece (box 230), and stores the multiple protected blocks such that even in the event of failures the original data piece can be recovered.

The ERC distributed data storage system 200 includes software or program modules for execution on the storage node computing device 210. In particular, the ERC distributed data storage system 200 includes a multiple protection group module 240 and a data block allocation module 250. The multiple protection group module 240 generates multiple protection groups for the original data piece 220. The data block allocation module 250 allocates both original data blocks and ERC data blocks among the storage nodes such the computation load is equally balanced between the storage nodes.

The ERC distributed data storage system 200 also includes a data write module 260 and a data read module 270. The data write module 260 appends a data block to storage nodes by performing mathematical modifications to the data blocks and replacing the old data block with the new data block. The data read module 270 recovers data by determining whether a data block is alive or dead on a storage node and acting accordingly. The operation of each of these modules will be discussed in detail below.

Figure 3:
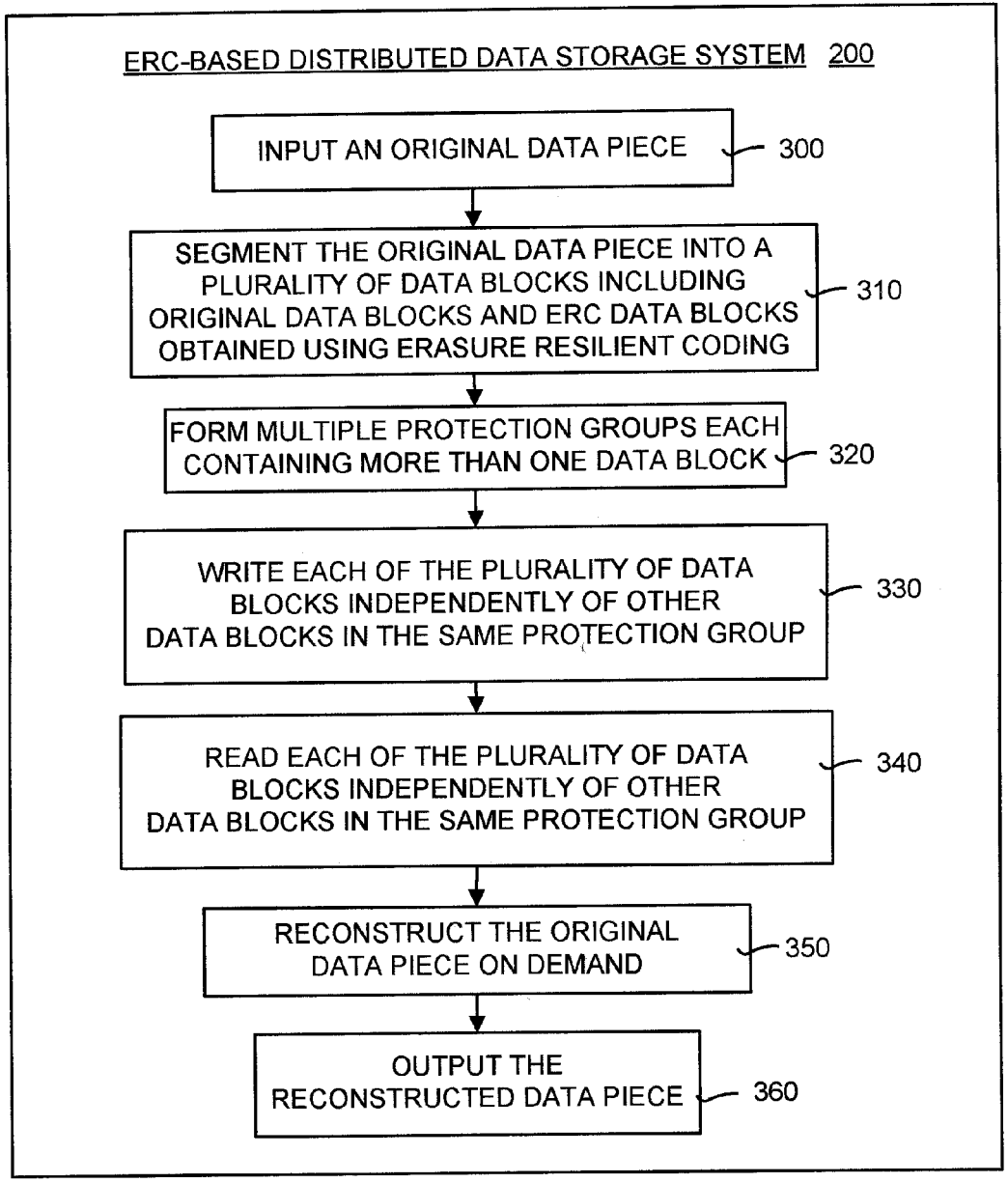
FIG. 3 is a flow diagram illustrating the general operation of the method used in the ERC distributed data storage system shown in FIGS. 1 and 2.

FIG. 3 is a flow diagram illustrating the general operation of the method used in the ERC distributed data storage system shown in FIGS. 1 and 2. In general, the ERC distributed data storage method processes an original data piece to ensure that the data piece can be reconstructed even in the case of hardware failures. More specifically, the ERC distributed data storage method begins by inputting an original data piece (box 300). The original data piece then is segmented into a plurality of data block (box 310). These plurality of data blocks include original data blocks and ERC data blocks. The ERC data blocks are obtained using erasure resilient coding, which is well known in the art.

The method then forms multiple protection group each having more than a single data block (box 320). These multiple protection groups add another layer of data reliability. Next, each of the plurality of data blocks can be written independently of other data blocks in the same protection group (box 330). Similarly, each of the plurality of data blocks also can be read independently of other data blocks in the same protection group (box 340). The read and write operations can be used to reconstruct the data piece on demand (box 350). Once requested, the method reconstructs the data piece and outputs a reconstructed data piece (box 360).

II. Operational Details

Each of the mentioned above will now be discussed in further detail. In particular, details of the multiple protection group module 240, the data block allocation module 250, the data write module 260, and the data read module 270 will be discussed to further clarify the details of the ERC distributed data storage system and method.

Multiple Protection Group Module

Figure 4:
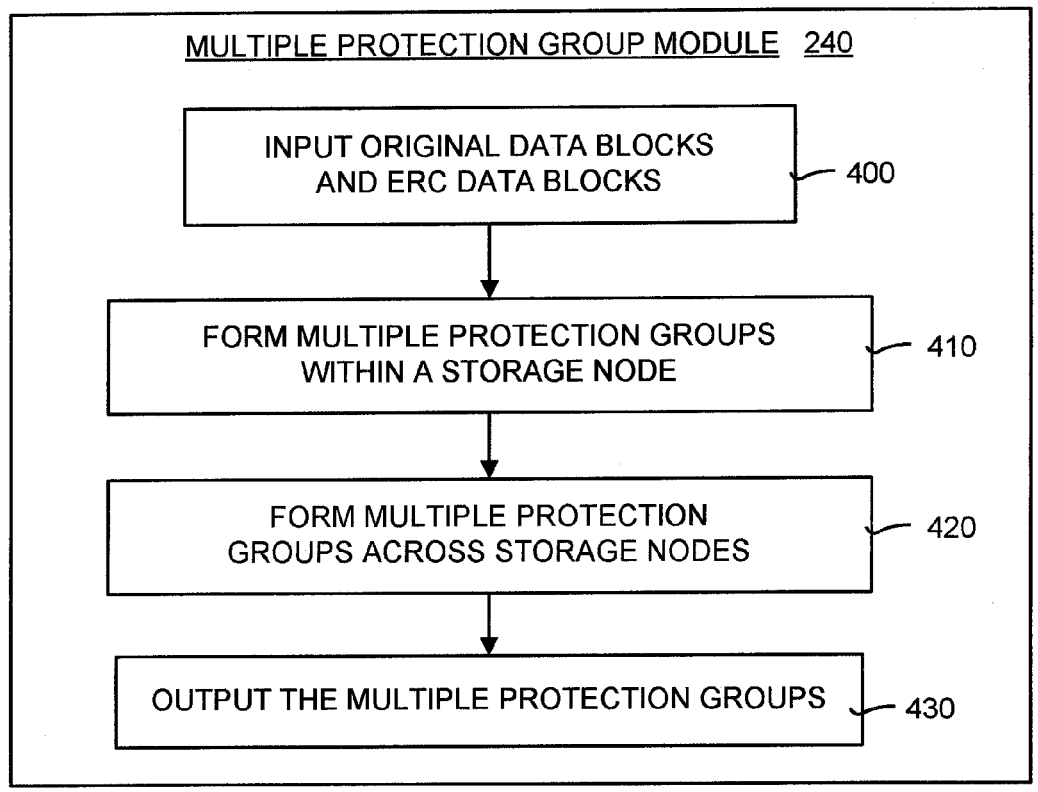
FIG. 4 is a flow diagram illustrating the detailed operation of the multiple protection group module shown in FIG. 2.

FIG. 4 is a flow diagram illustrating the detailed operation of the multiple protection group module 240 shown in FIG. 2. In general, the module 240 generates multiple protection groups for protecting data. The operation begins by inputting original data blocks and ERC data blocks (box 400). Some multiple protection groups are formed within storage nodes (box 410), while some multiple protection groups are formed across storage nodes (box 420). The output of the module are the multiple protection groups (box 430).

Figure 5:
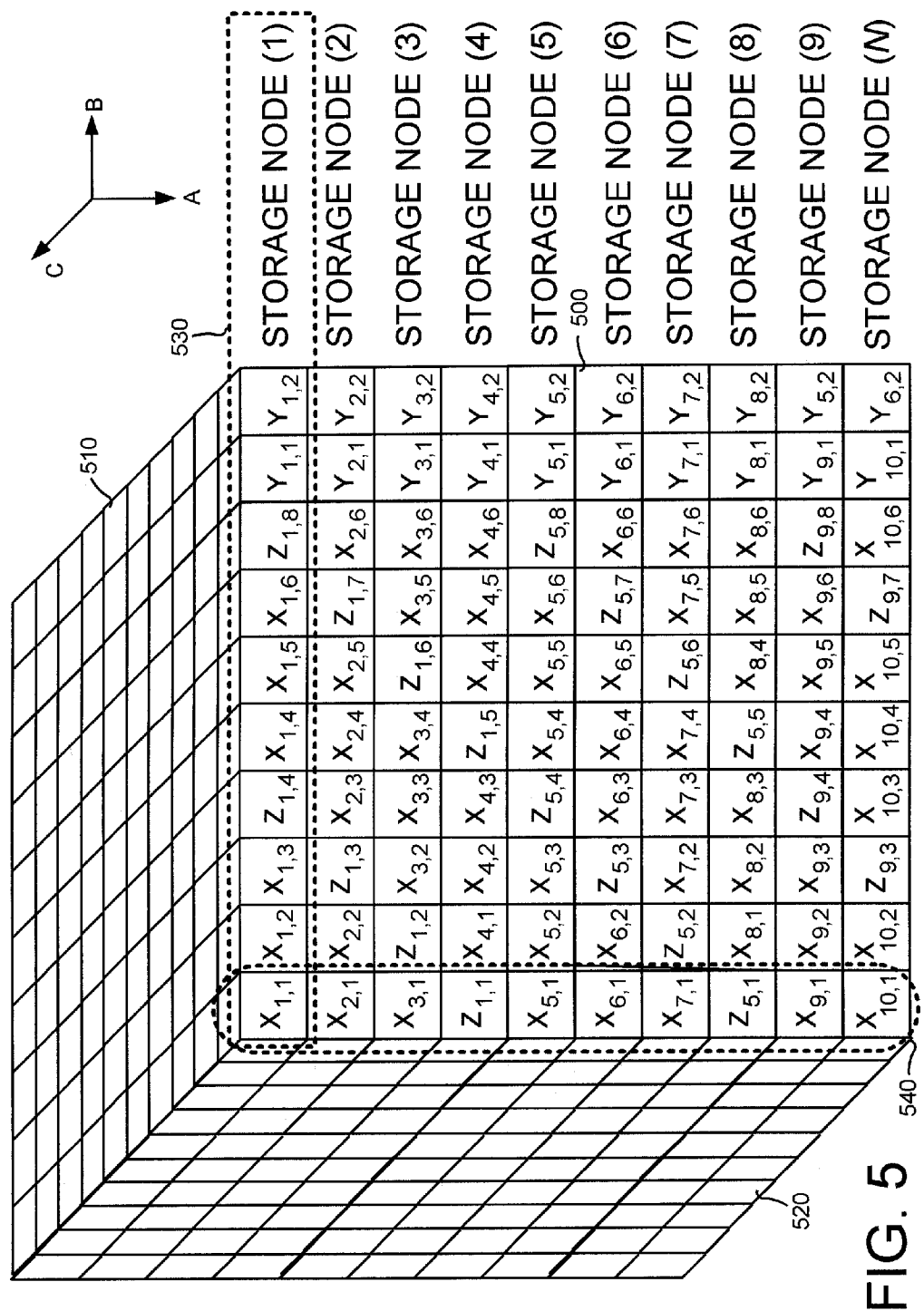
FIG. 5 is a block diagram illustrating an example of multiple protection groups formed both across and within storage nodes.

FIG. 5 is a block diagram illustrating an example of multiple protection groups formed both across and within storage nodes. The example of FIG. 5 illustrates N storage node clusters, from storage node cluster (1) to storage node cluster (N). Note that in the example of FIG. 5, N=10. It should be noted that each storage node cluster can be data centers located in different geographic locations.

The idea behind forming the protection groups is that there are a plurality of data blocks that can be located on different storage nodes. A key concept is that the erasure chunks are interleaved into each data center or storage node cluster. This alleviates the need to dedicate one data center or machine to erasure coding only.

As shown in FIG. 5, a 3D array of storage node clusters is illustrated, such that each block represents a storage node. The 3D planes of the array are labeled as A, B, C. The array includes an A-B face 500, a B-C face 510, and an A-C face 520. The A-B face 500 is shown labeled, where $X_{i,j}$ represents an original data block, $Y_{i,j}$ represents an erasure-coded data chunk within the same data center or storage node cluster, and $Z_{i,j}$ represents an erasure-coded data chunk across the data center or storage node cluster. It should be noted that the $Z_{i,j}$'s are interleaved with each line such that there is no need to dedicate any single data center or storage node cluster for erasure coding.

Examples of protection groups for this data are shown by the dashed lines. Protection groups can be formed within storage nodes clusters. In particular, a first protection group 530 is formed within storage node cluster (1). In addition, protection groups can also be formed across storage nodes. As shown FIG. 5, a second protection group 540 is formed across the storage node clusters. In addition, some data blocks belong to a single protection group while other data blocks belong to multiple protection groups. For example, the original data blocks $X_{11}$ belongs to multiple protection groups, while other data blocks may belong to a single protection group. Forming multiple protection groups in this manner provides data protection within a storage node and across a storage node.

Data Block Allocation Module

Figure 6:
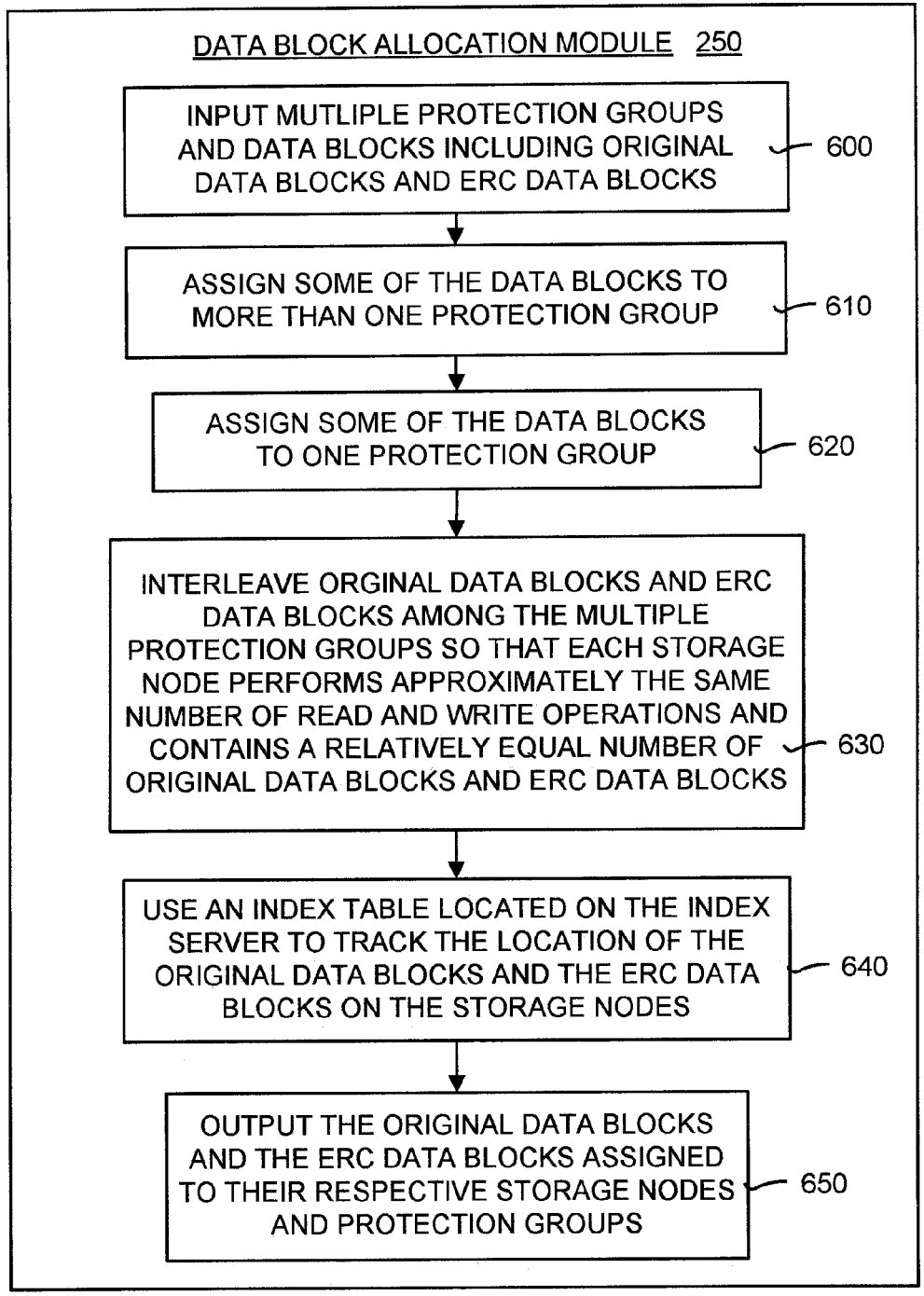
FIG. 6 is a flow diagram illustrating the detailed operation of the data block allocation module shown in FIG. 2.

FIG. 6 is a flow diagram illustrating the detailed operation of the data block allocation module 250 shown in FIG. 2. In general, the module 250 allocates data blocks to different storage nodes by smoothing the load each storage node has to bear. More specifically, the module 250 inputs the multiple protection group and data blocks including the original data blocks and the ERC data blocks (box 600). Some of the data blocks then are assigned to more than one protection group (box 610), while some data blocks are assigned to a single protection group (box 620).

The module 250 then interleaves original data blocks and ERC data blocks among the multiple protection groups so that the load is balanced across the storage nodes (box 630). Specifically, in some embodiments the criteria for load balancing is that each storage node performs approximately the same number of read and write operations. In other embodiments, the criteria for load balancing is that each storage node contains a relatively equal number of original data blocks and ERC data blocks.

Recall from above that the original data piece is split into multiple data blocks. An ERC data block has more complicated operations as compared to an original data block. In particular, the ERC data block has four times the read and write operations of an original data blocks. In addition, an input/output (I/O) operation must be performed any time one of the ERC data blocks is touched. Thus, the ERC data blocks are more heavily loaded that the original data blocks. If there were storage nodes that only stored and processed ERC data blocks, then that node would quickly become overloaded. The idea is to interleave the original data blocks and the ERC data blocks on different storage nodes so that on average each machine has the same number of input/output (I/O) operations. Interleaving the ERC data blocks with the original data blocks on the storage nodes serves to balance the load.

The module 250 then uses an index table located on the index server 100 to track the location of the original data blocks and the ERC data blocks on the storage nodes (box 640). Since the original data piece exist on a plurality of different storage nodes, it is necessary to keep track of where the data objects are located. An index table located on the index server 100 is used to keep track of this information. The index table keeps track of how many data blocks each original data piece has, and, for each original data piece, which storage nodes contain the data blocks. In addition, the index table keeps track of whether the data block is an original data block or an ERC data block.

The allocation information for each data block is stored on the index server 100 in the index table, as described above. It should be noted that it is assumed that the index server 100 is reliable. The index server 100 can achieve this reliability by using the ERC distributed data storage system and method or a replication technique. Since the size of the index table typically is not that large, the replication technique may be used. In some embodiments the index server 100 is a structured query language (SQL) server. Finally, the module 250 outputs the original data blocks and the ERC data blocks assigned to their respective storage nodes and protection groups (box 650).

Data Write Module

Figure 7:
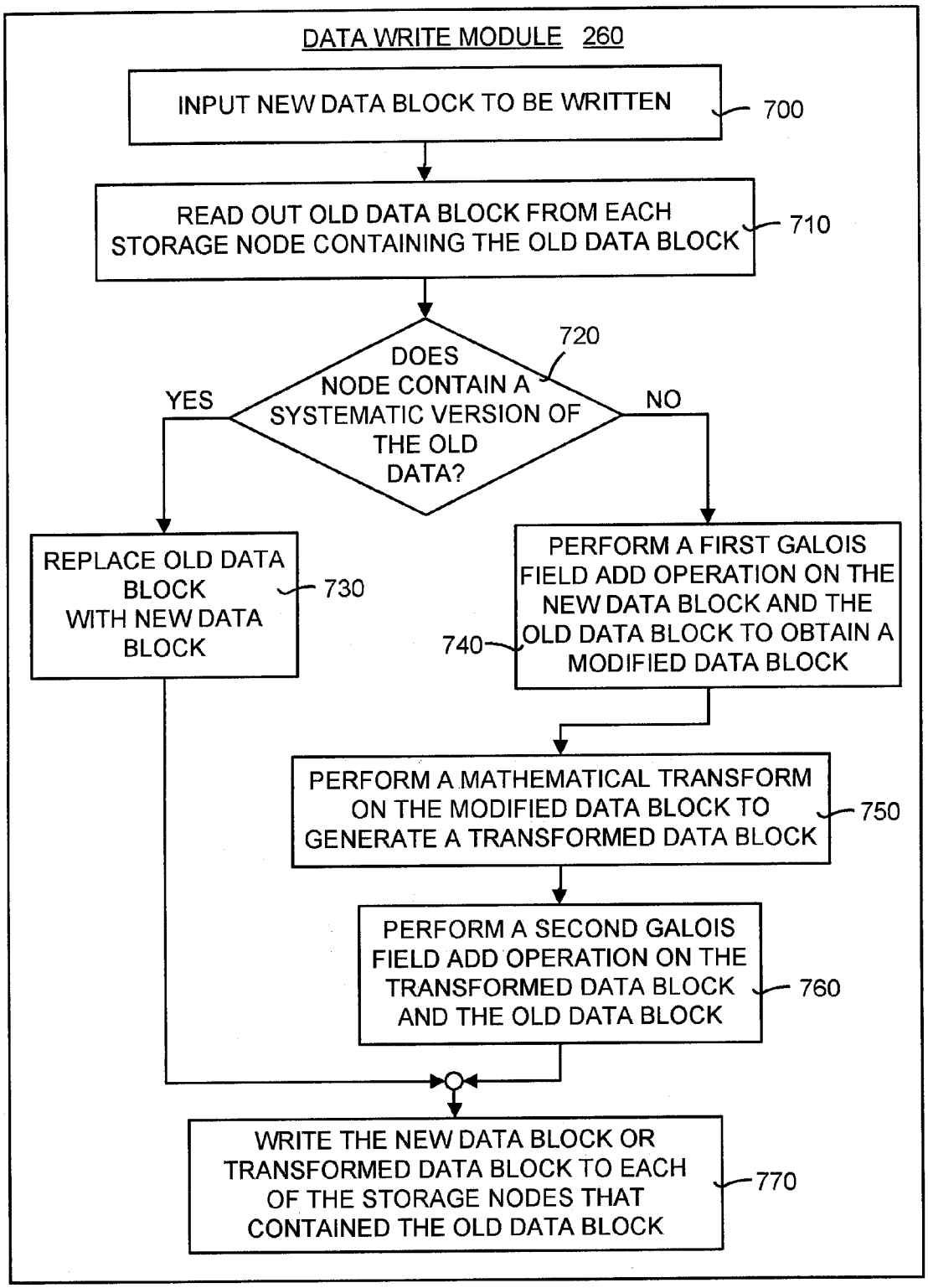
FIG. 7 is a flow diagram illustrating the detailed operation of the data write module shown in FIG. 2.

FIG. 7 is a flow diagram illustrating the detailed operation of the data write module 260 shown in FIG. 2. In general, the module 260 uses a write operation to replace an old data block with a new data block or append a new data block to existing data. In particular, the module 260 inputs a new data block to be written or appended (box 700). Next, an old data block (if it exists) is read out from each storage node that contains the old data block (box 710). Note that if the old data block does not exists, then the write operation is simply an append. This means that the new data block is appended to the beginning or end of data already stored on a storage node.

The module 260 then makes a determination as to whether the node contains a systematic version of the old data. This determination is made because there are two cases for the write operation. In the first case, a node contains the systematic version of the old data, in which case the module 260 then replaces an old data block with the new data block (box 730). In a second case, the node does not contain the systematic version of the old data, in which case two Galois fields are used. In this second case, a first Galois field add operation is performed on the new data block and the old data block (box 740). Galois field arithmetic is well known to those having ordinary skill in the art. This yields a modified data block. A mathematical transform then is performed on the modified data block using erasure resilient coding to generate a transformed data block (box 750). A second Galois field add operation is performed on the transformed data block and the old data block (box 760). The module 260 then writes the new data block (in the first case) or the transformed data block (in the second case) to each of the storage nodes that contained the old data block (box 770).

During the write operation the write needs to be propagated to all storage nodes within the protection groups to which the nodes belong. By way of example, assume a storage node belongs to two protection groups: a first protection group containing 4 protection nodes, and a second protection group containing 1 protection node. During an erasure write, the write operation is applied to 5 protection nodes over two separate protection groups. The write operation basically performs the first Galois field add on new data block with the old data block. The resultant modified data block then is propagated to each of the protection groups. For each of the protection groups a linear transformation is applied to the modified data block to obtain the transformed data block. If the write operation is an append only (meaning that the old data block is zero), then the new data block is append to either end of the existing data.

Data Read Module

Figure 8:
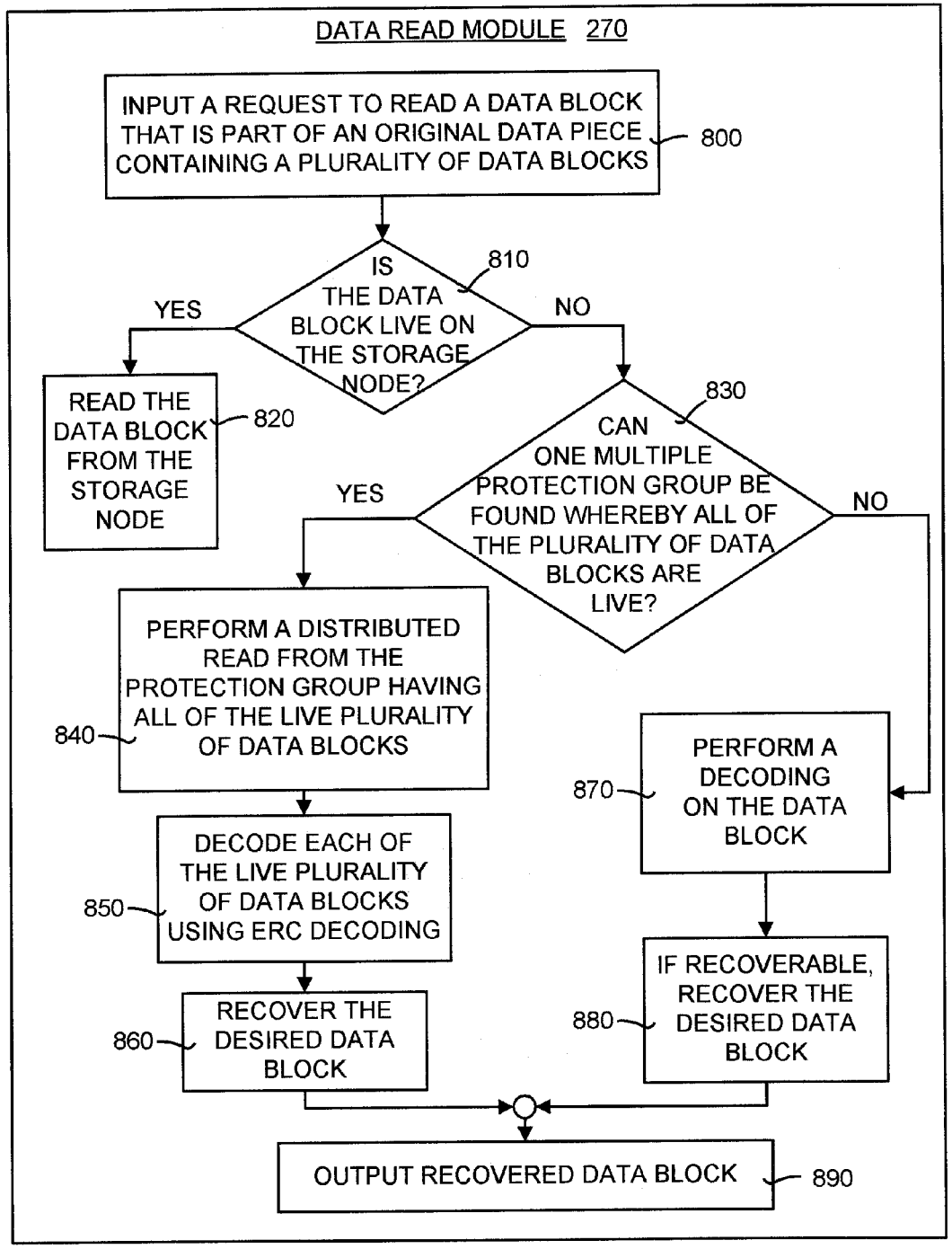
FIG. 8 is a flow diagram illustrating the detailed operation of the data read module shown in FIG. 2.

FIG. 8 is a flow diagram illustrating the detailed operation of the data read module 270 shown in FIG. 2. In general, the module 260 uses a read operation to recover a desired data block from the storage nodes. Specifically, the module 270 inputs a request to read a data block (box 800). This data block is part of an original data piece that contains a plurality of data blocks.

The module 270 then makes a determination as to whether the data block is live (or alive) on the storage node (box 810). By "live", it is meant that there has not been a hardware failure, power failure, shutdown, or some other event that keeps the data block from being accessed. On the other hand, if the data block is "stale" it means that a failure has occurred or the machine is in the process of recovering from a failure. If the data block is live on the storage node, then a single read is performed such that the data block is read directly from the storage node (box 820).

If the data block is not live (or "stale") on the storage node, then the module 270 makes another determination as to whether one multiple protection group can be found whereby all of the plurality of data blocks are live (box 830). For example, assume that the original data piece was fragmented into k data blocks, where k is a positive integer value. The idea is to find a protection group having all k data blocks that are live.

If a protection group can be found where the plurality of data blocks are live, then the module 270 performs a distributed read from that protection group (box 840). The distributed read operation can succeed if k out of n blocks in the protection group are live. Note that all n blocks of a protection group do not need to be live, only k out of the n blocks. Using the present example, the module 270 would perform a distributed read of all of the k data blocks. Next, an ERC decoding is performed on each of the plurality of live data blocks (box 850). The desired data block then is recovered in this manner (box 860).

If no protection group can be found having all of the live plurality of data blocks, then a decoding using a method other than ERC decoding is performed on the data block (box 870). There is no guarantee that another type of decoding will work to recover the desired data block. If recoverable, however, the module 270 recovers the desired data block (box 880) and outputs the recovered data block (box 890).

III. Exemplary Operating Environment

The erasure resilient coding (ERC) distributed data storage system and method is designed to operate in a computing environment. The following discussion is intended to provide a brief, general description of a suitable computing environment in which the ERC distributed data storage system and method may be implemented.

Figure 9:
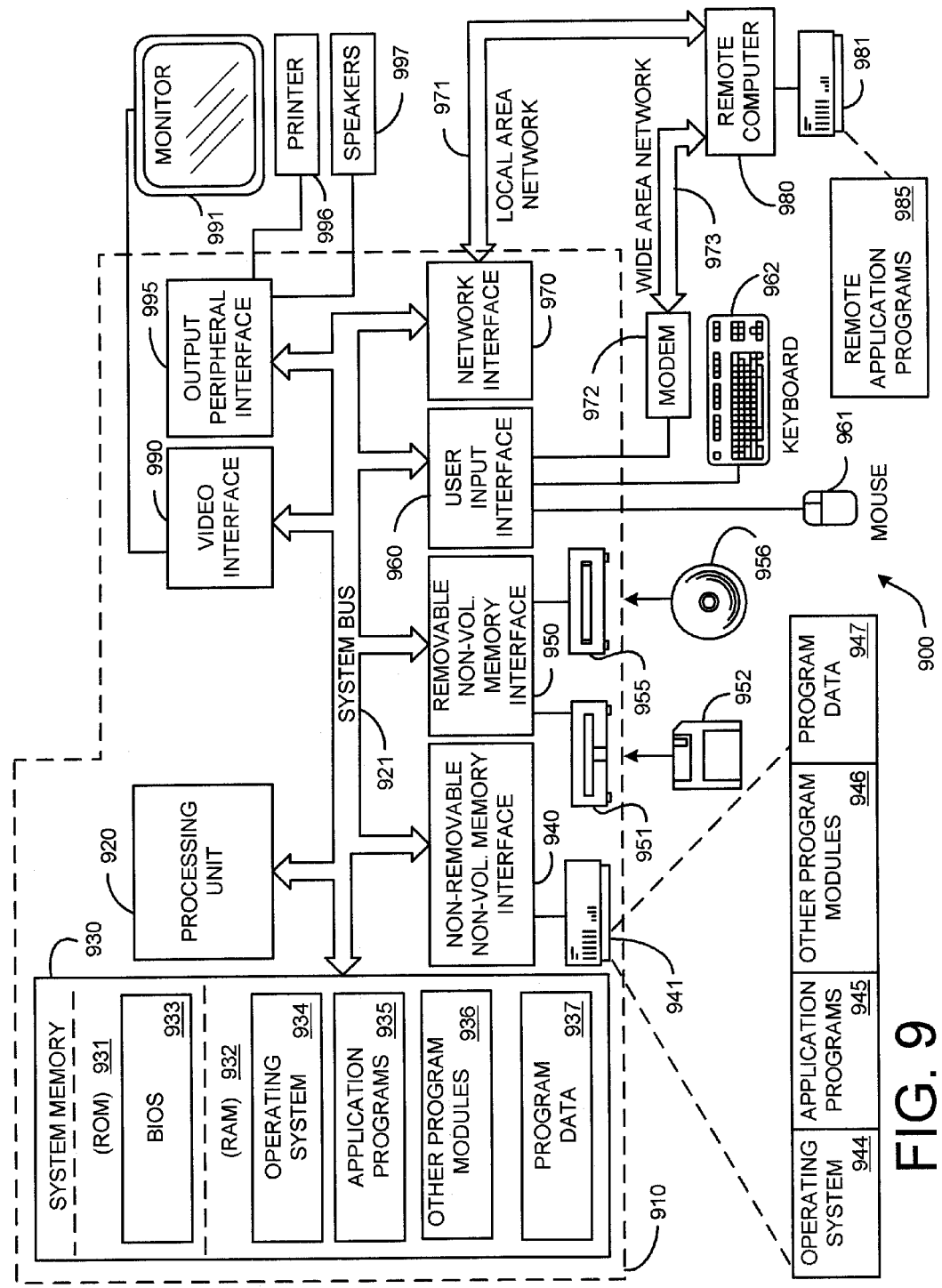
FIG. 9 illustrates an example of a suitable computing system environment in which the ERC distributed data storage system and method shown in FIGS. 1-8 may be implemented.

FIG. 9 illustrates an example of a suitable computing system environment in which the ERC distributed data storage system and method shown in FIGS. 1-8 may be implemented. The computing system environment 900 is only one example of a suitable computing environment and is not intended to suggest any limitation as to the scope of use or functionality of the invention. Neither should the computing environment 900 be interpreted as having any dependency or requirement relating to any one or combination of components illustrated in the exemplary operating environment.

The ERC distributed data storage system and method is operational with numerous other general purpose or special purpose computing system environments or configurations. Examples of well known computing systems, environments, and/or configurations that may be suitable for use with the ERC distributed data storage system and method include, but are not limited to, personal computers, server computers, hand-held (including smartphones), laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The ERC distributed data storage system and method may be described in the general context of computer-executable instructions, such as program modules, being executed by a computer. Generally, program modules include routines, programs, objects, components, data structures, etc., that perform particular tasks or implement particular abstract data types. The ERC distributed data storage system and method may also be practiced in distributed computing environments where tasks are performed by remote processing devices that are linked through a communications network. In a distributed computing environment, program modules may be located in both local and remote computer storage media including memory storage devices. With reference to FIG. 9, an exemplary system for the ERC distributed data storage system and method includes a general-purpose computing device in the form of a computer 910 (the storage node computing device 210 is an example of the computer 910).

Components of the computer 910 may include, but are not limited to, a processing unit 920 (such as a central processing unit, CPU), a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 910 typically includes a variety of computer readable media. Computer readable media can be any available media that can be accessed by the computer 910 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 910. Communication media typically embodies computer readable instructions, data structures, program modules or other data in a modulated data signal such as a carrier wave or other transport mechanism and includes any information delivery media.

Note that the term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 940 includes computer storage media in the form of volatile and/or nonvolatile memory such as read only memory (ROM) 931 and random access memory (RAM) 932. A basic input/output system 933 (BIOS), containing the basic routines that help to transfer information between elements within the computer 910, such as during start-up, is typically stored in ROM 931. RAM 932 typically contains data and/or program modules that are immediately accessible to and/or presently being operated on by processing unit 920. By way of example, and not limitation, FIG. 9 illustrates operating system 934, application programs 935, other program modules 936, and program data 937.

The computer 910 may also include other removable/non-removable, volatile/nonvolatile computer storage media. By way of example only, FIG. 9 illustrates a hard disk drive 941 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

The drives and their associated computer storage media discussed above and illustrated in FIG. 9, provide storage of computer readable instructions, data structures, program modules and other data for the computer 910. In FIG. 9, for example, hard disk drive 941 is illustrated as storing operating system 944, application programs 945, other program modules 946, and program data 947. Note that these components can either be the same as or different from operating system 934, application programs 935, other program modules 936, and program data 937.

Operating system 944, application programs 945, other program modules 946, and program data 947 are given different numbers here to illustrate that, at a minimum, they are different copies. A user may enter commands and information (or data) into the computer 910 through input devices such as a keyboard 962, pointing device 961, commonly referred to as a mouse, trackball or touch pad, and a touch panel or touch screen (not shown).

Other input devices (not shown) may include a microphone, joystick, game pad, satellite dish, scanner, radio receiver, or a television or broadcast video receiver, or the like. These and other input devices are often connected to the processing unit 920 through a user input interface 960 that is coupled to the system bus 921, but may be connected by other interface and bus structures, such as, for example, a parallel port, game port or a universal serial bus (USB). A monitor 991 or other type of display device is also connected to the system bus 921 via an interface, such as a video interface 990. In addition to the monitor, computers may also include other peripheral output devices such as speakers 997 and printer 996, which may be connected through an output peripheral interface 995.

The computer 910 may operate in a networked environment using logical connections to one or more remote computers, such as a remote computer 980. The remote computer 980 may be a personal computer, a server, a router, a network PC, a peer device or other common network node, and typically includes many or all of the elements described above relative to the computer 910, although only a memory storage device 981 has been illustrated in FIG. 9. The logical connections depicted in FIG. 9 include a local area network (LAN) 971 and a wide area network (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 960, or other appropriate mechanism. In a networked environment, program modules depicted relative to the computer 910, or portions thereof, may be stored in the remote memory storage device. By way of example, and not limitation, FIG. 9 illustrates remote application programs 985 as residing on memory device 981. It will be appreciated that the network connections shown are exemplary and other means of establishing a communications link between the computers may be used.

The foregoing Detailed Description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A method for processing an original data piece having a plurality of data blocks in a distributed data storage system, comprising:
forming multiple protection groups within the distributed data storage system such that each of the multiple protection groups contains more than one of the plurality of data blocks; and
writing and reading each of the plurality of data blocks independently of other data blocks in a same multiple protection group to reconstruct any one of the plurality of data blocks on demand.

2. The method of claim 1, wherein the plurality of data blocks include original data blocks and erasure resilient coding (ERC) data blocks generated using erasure resilient coding.

3. The method of claim 2, further comprising forming the multiple protection groups such that any one of the plurality of data blocks belongs to more than one protection group.

4. The method of claim 3, wherein the distributed data storage system includes a plurality of storage nodes, and further comprising:
forming multiple protection groups within a storage node; and
forming protection groups across storage nodes.

5. The method of claim 4, further comprising interleaving original data blocks and ERC data blocks among the multiple protection groups such that each storage node performs approximately a same number of combined read and write operations.

6. The method of claim 5, further comprising using an index server containing an index table to track a location of the original data blocks and the ERC data blocks on the storage nodes.

7. The method of claim 6, further comprising writing a new data block over an old data block, the writing further comprising:
reading out the old data block from each storage node containing the old data block; and
replacing the old data block with the new data block.

8. The method of claim 7, further comprising:
performing a first Galois field add operation on the new data block and the old data block to obtain a modified data block;
performing a mathematical transform on the modified data block to generate a transformed data block; and
performing a second Galois field add operation on the transformed data block and the old data block to write the new data block.

9. The method of claim 6, wherein reading a data block further comprises:
determining whether the data block is alive on its storage node; and
reading directly from the data block from the storage node if it is alive.

10. The method of claim 9, further comprising:
determining that the data block is not alive;
determining whether any one of the multiple protection groups contains live plurality of data blocks;
performing a distributed read from a multiple protection group containing all live plurality of data blocks; and
using erasure resilient coding (ERC) decoding to recover the data block.

11. The method of claim 10, further comprising:
determining that none of the multiple protection groups contain all live plurality of data blocks; and
performing another type of decoding other than ERC decoding to attempt to recover the data block.

12. A computer-readable medium having computer-executable instructions for writing a data piece to a multiple protected data blocks contained in storage nodes of a distributed data storage system, comprising:
replacing an old data block with a new data block;
perform a first Galois field add operation on the new data block and the old data block to obtain a modified data block;
perform a mathematical transform on the modified data block to generate a transformed data block; and
writing the transformed data block to each of the storage nodes that contained the old data block.

13. The computer-readable medium of claim 12, further comprising reading out the old data block from each of the storage nodes containing the old data block.

14. The computer-readable medium of claim 13, further comprising performing a second Galois field add operation on the transformed data block and the old data block before writing the transformed data block to each of the storage nodes containing the old data block.

15. The computer-readable medium of claim 14, further comprising:
forming protection groups in the distributed data storage system such that the protection groups are formed both across the storage nodes and within storage nodes; and
interleaving the multiple protected data blocks having both original data blocks and ERC data blocks such that each storage node contains a relatively equal number of original data blocks and ERC data blocks.

16. A computer-implemented process for reading a data block that is part of an original data piece having a plurality of data blocks, the data block stored on a storage node in a distributed data storage system having multiple protection groups, comprising:
determining whether the data block is live on the storage node;
if the data block is live, then reading the data block from the storage node;
if the data block is not live, then finding one multiple protection group having all the live data blocks of the original data piece; and
decoding each of the live plurality of data blocks using an erasure resilient coding (ERC) decoding process to recover the data block.

17. The computer-implemented process of claim 16, further comprising performing a distributed read from the multiple protection group having all of the live plurality of data blocks prior to decoding.

18. The computer-implemented process of claim 17, further comprising performing another type of decoding other than ERC decoding on the plurality of data blocks if a multiple protection group cannot be found having all of the plurality of data blocks that are live.

19. The computer-implemented process of claim 18, further comprising writing the data block by:
reading out an old data block from a storage nodes containing the old data block;
replacing the old data fragment with the data block;
performing a first Galois field add operation on the data block and the old data fragment to create a modified data block;

performing a mathematical transform on the modified data block to create a transformed data block; and performing a second Galois field add operation on the transformed data block to write the transformed data block to the storage nodes that contained the old data blocks.

20. The computer-implemented process of claim 19, further comprising:

forming the multiple protection groups such that protection groups are formed both across and within storage nodes in the in the distributed data storage system; and writing and reading the data block independently of other data blocks in a same multiple protection group.

* * * * *